J. KALOTA.
EXPANSIBLE HORSESHOE.
APPLICATION FILED DEC. 13, 1915.
1,169,962.
Patented Feb. 1, 1916.
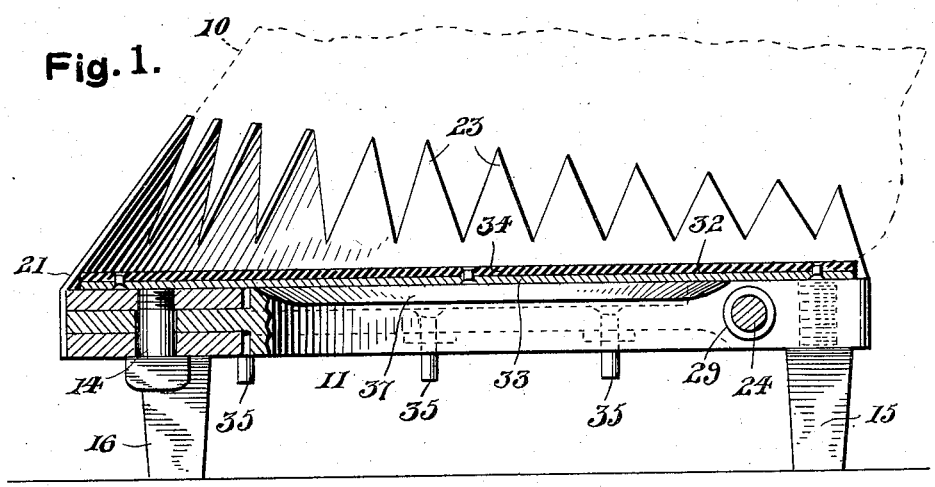
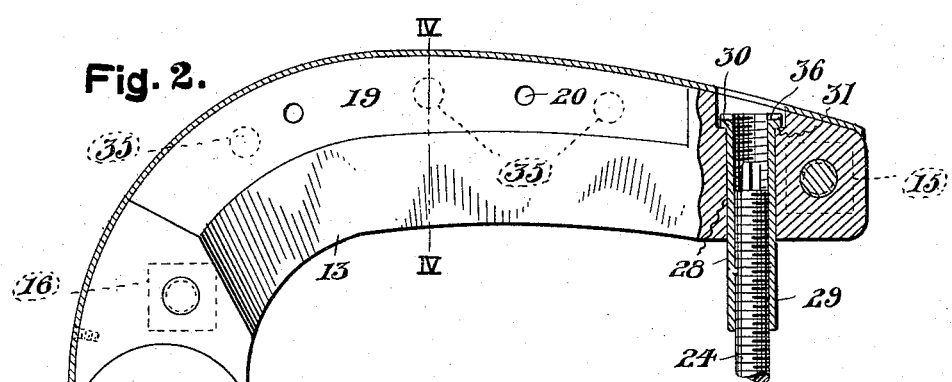
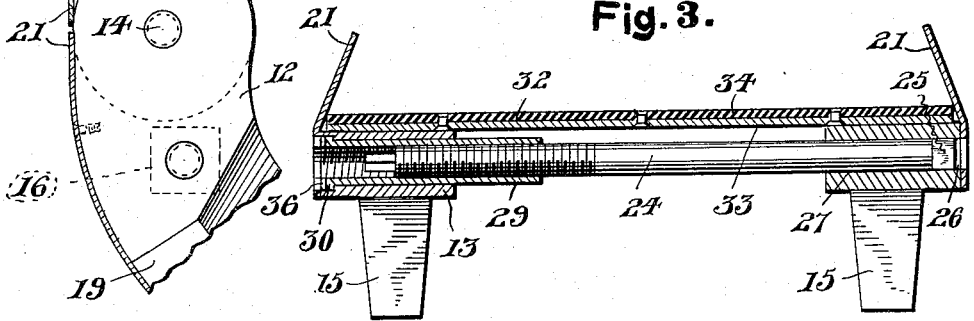
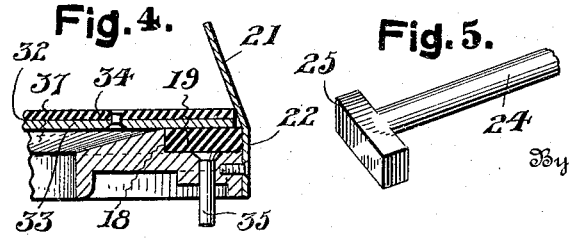
Inventor
J. Kalota
Attorney
THE COLUMBIA PLANOGRAPH CO., WASHINGTON, D. C.

UNITED STATES PATENT OFFICE.

JOHN KALOTA, OF WEST ALLIS, WISCONSIN.

EXPANSIBLE HORSESHOE.

1,169,962.   Specification of Letters Patent.   Patented Feb. 1, 1916.

Application filed December 13, 1915. Serial No. 66,538.

*To all whom it may concern:*

Be it known that I, JOHN KALOTA, a citizen of the United States, residing at West Allis, in the county of Milwaukee and State of Wisconsin, have invented certain new and useful Improvements in Expansible Horseshoes, of which the following is a specification.

This invention relates to certain new and useful improvements in expansible horseshoes.

The primary object of the invention is the provision of a horseshoe capable of operative positioning upon different sized hoofs without the employment of the usual horseshoe nails or other similar hold-fast devices.

A further object of the device is to provide a clamp mounting shoe with resilient marginal supports for the hoof of the animal, thereby cushioning the portion of the foot upon which the working strains are exerted, the device also being arranged with a cushioning pad supportingly contacting the entire lower surface of the hoof.

It is also designed in this invention to provide a two-part horseshoe adapted for clamping upon different sized hoofs with marginal cushions upon its hoof-engaging surface, the said cushions having a plurality of shiftable removing members.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—Figure 1 is a central sectional view taken through the device operatively positioned upon a hoof, the latter being shown in dotted lines. Fig. 2 is a top plan view of a portion thereof, parts being broken away. Fig. 3 is a transverse sectional view of the device taken upon the plane of the clamping bolt. Fig. 4 is a transverse sectional view taken upon line IV—IV of Fig. 2, and, Fig. 5 is a perspective view of the anchoring end of the clamping bolt.

It being understood that the present arrangement of horseshoe is adapted for employment upon the hoof of an animal, a horse's hoof 10 is herein indicated in dotted lines in Fig. 1 of the drawing having the present device clamped thereon, the use of nails or screws being unnecessary for operatively attaching the device.

The horseshoe 11 which is of substantially the usual arch-shaped contour is formed of two oppositely-positioned similar coöperating sections 12 and 13, the said sections being hinged together at their toe portions by means of a pivoting bolt 14 and whereby the said two sections may be relatively shifted. Any desirable form of heel calks 15 and toe calks 16 are secured to the shoe sections 12 and 13 as by removably screw-threading the same into the said sections. The shoe sections are provided with longitudinally-extending marginal cut-away sockets 18 upon their upper supporting faces, being oppositely positioned upon the shoe 11 while cushion strips 19 are removably arranged and fitted within the said sockets 18. The said strips 19 are formed of rubber or any suitable resilient material and have perforations 20 extending therethrough.

Each of the sections 12 and 13 is provided with a metallic hoof-engaging retaining band 21, extending substantially around the entire outer edges of the said shoe sections and permanently secured to the said outer edges thereof by means of the attaching portions 22 of the said bands arranged adjacent the corresponding edges thereof. The main portion of the bands 21 projects inwardly of the shoe sections 12 and 13 being angularly-disposed with respect to the attaching portions 22 of the bands and being scalloped for forming pointed fingers 23 which are adapted to engage the sides of the hoof 10 when the shoe is operatively positioned thereon.

A clamping or operating bolt 24 is provided for the sections 12 and 13, one end of the said bolt 24 having an anchoring cross head 25 which is slidably positioned in a correspondingly-shaped socket 26 within the heel portion of the shoe section 12 while the bolt 24 extends inwardly of the shoe through a cylindrical opening 27 of the said shoe section heel. The corresponding heel portion of the shoe section 13 is provided with a cylindrical bore 28 in substantial alinement with the aforementioned opening 27 and an internally threaded operating sleeve 29 is revolubly journaled within the bore 28 and is threaded upon the adjacent end of the bolt 24 while a head 30 of the sleeve 29 engages an annular shoulder 31 of the bore 28, the sleeve being thus swiveled within the said heel portion of the shoe section 13.

A cushioning pad 32 is provided for overlying the entire shoe 11 within the bands 21 in a manner to contact the entire lower surface of the hoof 10 and thereby resiliently support the hoof upon the shoe. This pad 32 consists of a metallic plate 33 and a resilient or rubber plate 34 secured thereto, the said pad 32 being preferably positioned with the rubber surface 34 thereof uppermost in contact with the said hoof 10.

The shoe sections 12 and 13 are provided with a plurality of ejecting pins 35 slidably positioned through the said section and underlying the cushion strips 19, it being evident that a movement of the pin 35 will tend to forcibly eject the said cushion strips 19 from their receiving sockets 18.

From this detailed description of the invention, it will be seen that with the shoe sections 12 and 13 arranged with their heel portions widely separated, the shoe 11 having the strips 19 and pad 32 in position thereon may be readily positioned upon the horse's hoof 10 with the hoof received inwardly of and between the opposite bands 21 and with the bottom of the hoof flatly engaging the said pad 32. The sleeve 29 may be then turned by inserting a proper instrument, such as a screw-driver within the end kerf 36 thereof and whereupon a turning of the sleeve 29 in its screw-threaded engagement with the bolt 24 will draw the heel portions of the shoe sections 12 and 13 toward each other, thus clamping the shoe sections upon the hoof 10 and locking the shoe in its operative position thereupon. When desired to remove the shoe from the hoof, the sleeve 29 is rotated in the opposite direction, thus separating the heel portions of the sections 12 and 13 by moving the sections upon their pivot bolt 14 and allowing the shoe to be readily removed from the hoof 10. The pad 32 may be removed when the shoe sections 12 and 13 are sufficiently separated to allow this to be done while the cushion strips 19 may be forced from their receiving sockets 18 by inwardly impelling the ejecting pins 35 thereof as hereinbefore referred to.

It will be seen that the shoe sections are provided with inwardly sloping surfaces 37 which being arranged adjacent the sockets 18, position the cushioning strips 19 for forming the major portion of the hoof-engaging surface of the shoe.

It will thus be evident that a complete horseshoe is provided which may be operatively clamped to different sized hoofs and when operatively positioned thereon is doubly cushioned for reducing the jar and strain upon the animal's hoof, as well as inuring to the longevity of the horseshoe.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A horseshoe comprising similar oppositely arranged sections pivotally connected together at the toe portions thereof, the heel portions of said sections being respectively provided with an anchoring socket and opening, and a bore having an annular bearing shoulder, a clamping bolt projecting through the said opening and having a head restrainingly seated within the said socket, an operating sleeve swiveled within the said bore and in contact with the said bolt, the outer end of the said sleeve being provided with a kerf.

2. A horseshoe comprising similar oppositely arranged sections pivotally connected together at the toe portions thereof, the heel portions of said sections being respectively provided with an anchoring socket and opening, and a bore having an annular bearing shoulder, a clamping bolt projecting through the said opening and having a head restrainingly seated within the said socket, an operating sleeve swiveled within the said bore and in contact with the said bolt, the outer end of the said sleeve being provided with a kerf, metallic retaining bands secured to the outer edges of the said shoe sections and having inwardly projecting fingered portions overlying the hoof-engaging surfaces of the said sections, removable cushion strips carried by the outer edges of the hoof-engaging surfaces of the said sections, and a hoof cushioning pad mounted upon the said sections and cushion strips inwardly of the said bands.

3. A horseshoe provided with its receiving sockets upon the opposite outer edges of the hoof-engaging face thereof, resilient cushioning strips removably positioned within the said sockets, band members carried by the outer edges of the said shoe and positioned outwardly of the said strips, and ejecting pins for the said strips slidably projecting through the said shoe and normally underlying the said strips and having engaging free ends adjacent the ground-engaging surface of the shoe.

4. A clamp horseshoe comprising opposite pivoted sections, marginal hoof-engaging retaining bands carried by the outer edges of the said sections, the said sections having marginally-extending sockets adjacent the said bands within the hoof-engaging surfaces thereof, cushioning strips removably positioned within the said sockets, and ejecting pins for the said strips slidably positioned through the said sections underlying the said strips and accessibly extending adjacent the ground-engaging surface of the shoe.

In testimony whereof I affix my signature.

JOHN KALOTA.

Copies of this patent may be obtained for five cents each, by addressing the "Commissioner of Patents, Washington, D. C."